Patented Oct. 9, 1945

2,386,309

UNITED STATES PATENT OFFICE 2,386,309

ANTHRAQUINONE COMPOUNDS AND A PROCESS FOR THEIR MANUFACTURE

Ernst Gutzwiller, Basel, Switzerland, assignor to Sandoz Ltd., Fribourg, Switzerland, a Swiss firm No Drawing. Application November 29, 1943, Serial No. 512,243. In Switzerland December 24, 1942

4 Claims. (Cl. 260—379)

The present invention relates to new anthraquinone compounds which are valuable dyestuffs for dyeing wool, silk and nylon in pure blue shades which are stable to light and do not change their shade into red in artificial light, and to a process for their manufacture.

From the British Specification 546,383 it has become known that anthraquinone compounds containing in their molecule replaceable groups can be condensed with amino alcohols of the general formula

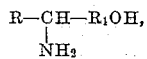

wherein R and $R_1$ stand for a member of the group consisting of alkyl and alkylene, and transformed into water-soluble acid dyestuffs by treating the same with sulfonating agents.

I have now found that very valuble anthraquinone dyestuffs can be prepared by condensing anthraquinone compounds containing in the positions 1 and 4 replaceable groups and which are further substituted in the position 6 and/or 7 by halogen, with amino compounds of the general formula

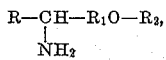

wherein R stands for alkyl, $R_1$ stands for alkylene and $R_2$ for hydrogen or an $SO_3H$ group, and in case they are water-insoluble, by transforming them into the respective sulfuric acid esters by treatment with sulfonating agents.

The new dyestuffs prepared according to the present invention are differentiated from those described in the above cited British specification by their better fastness to light and the property of not changing the shade in artificial light.

As replaceable substituents that stand in 1- and 4-position of the anthraquinone molecule, the following ones may be cited: halogen, nitro, hydroxy, alkoxy, amino, alkylamino, arylamino and sulfuric acid group. Therefore, the following anthraquinone compounds can be used for the condensation: halogenoanthraquinones like 1:4:6-trihalogenoanthraquinones, 1:4:6:7-tetrahalogenoanthraquinones, 1:4-dihydroxy-6-halogenoanthraquinone, 1:4 - dihydroxy - 6:7-dihalogenoanthraquinone, 1-hydroxy-4-amino-6- or -7-halogeno or -6:7-dihalogenoanthraquinone respectively, 1:4-diamino-6-halogeno- or -6:7-dihalogenoanthraquinone and the leuco compounds of the above cited derivatives.

As amino alcohols there may be used for instance 2-amino-propanol-1, 2-aminobutanol-1, 2-aminopentanol-1, 3-aminobutanol-1, 2-aminopropandiol-1:3 and also their isomers with ramified carbon chain. These amino alcohols can further be substituted, thus containing for example halogen, sulfo or phosphoric acid groups or they can be esterified at the hydroxy group by sulfuric or phosphoric acid. As the anthraquinone compounds used for the condensation contain two replaceable substituents in the α-position, different amino alcohols can be employed in molecular proportions, simultaneously or one after the other, for the condensation, whereby products containing different hydroxyalkylamino chains are obtained.

The following examples, without being limitative, describe the present invention, the parts being by weight:

Example 1

10 parts of leuco-6-chloroquinizarine, 8 parts of 2-aminopropanol-1 and 50 parts of ethanol are stirred together at 60°–80° C. until the condensation is finished. The leuco compound thus obtained is oxidized by means of an air stream, whereby it is advantageous to add to the mixture some piperidine and copper acetate. After cooling down the new compound is filtered and washed with ethanol. The 1:4-di-(propanol-1'-amino-2')-6-chloroanthraquinone dissolves in organic solvents with a brilliant blue coloration.

10 parts of the condensation product are dissolved while cooling in 40 parts of concentrated sulfuric acid of 90–100% strength. When a sample taken out shows that the product is easily soluble in water, the sulfonation mass is poured onto ice. Then after having separated the sulfuric acid by chalking, the dyestuff is separated from the mother-lye by salting out or evaporation to dryness.

The new compound possesses the formula

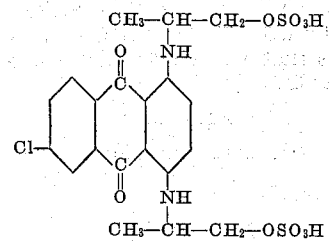

and dyes wool and other textile fibres in very brilliant blue shades being fast to light.

Instead of the leuco-6-chloroquinizarine a mixture of leuco-6-chloroquinizarine and of 6-chloroquinizarine can be used for the condensation.

Also 1-hydroxy-4-amino-6-chloroanthraquinone or 1:4-diamino-6-chloroanthraquinone or their leuco compounds respectively can be used. In all these causes the identical dyestuff will be obtained.

By using instead of leuco-6-chloroquinizarine the leuco-6:7-dichloroquinizarine, the 1:4-di-(propanol-1'-amino - 2') -6:7-dichloroanthraquinone will be obtained. This condensation product gives, after treatment with concentrated sulfuric acid, a dyestuff dyeing wool in greener shades as compared to the monochloro derivative.

*Example 2*

5 parts of leuco-6-quinizarine, 5 parts of 6-chloroquinizarine, 15 parts of 2-aminobutanol-1 and 50 parts of ethanol are stirred together at 50°–80° C. until the condensation has completed. After oxidation with an air stream the condensation product is isolated in the manner described in Example 1. After treating it with 3–6 times its weight of concentrated sulfuric acid of 90–100% strength or with weak oleum, preferably while cooling, a dyestuff will be obtained dyeing wool in very brilliant blue shades which are somewhat greener and faster than the dyestuff prepared according to Example 1. It corresponds to the formula

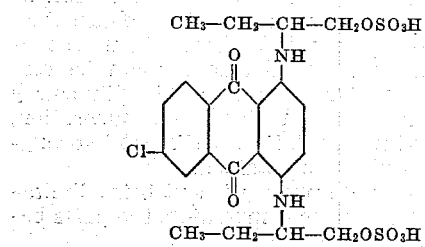

It seems that the fastness properties of the dyestuffs become better, when the hydro-oxyalkylamine chain becomes longer.

*Example 3*

5 parts of leuco-6:7-dichloroquinzarine, 5 parts of 6:7-dichloroquinizarine, 15 parts of 2-aminobutanol-1 and 50 parts of ethanol are stirred together at 50°–80° C. until the condensation is complete. After oxidation with an air stream the condensation product is separated by filtration. By treating it with 4–8 times its weight of sulfuric acid of 90–100% strength, preferably while cooling, a dyestuff possessing the formula

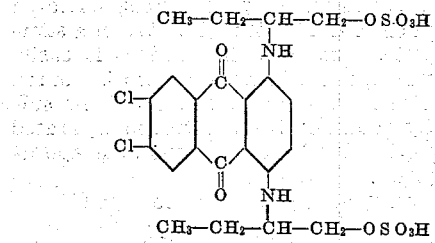

will be obtained. It dyes wool in very brilliant blue shades that are greener than those obtained according to Example 2.

*Example 4*

12 parts of leuco-6-chloroquinizarine, 18 parts of the sodium salt of the sulfuric acid ester of 2-aminobutanol-1, 80 parts of ethanol and 12 parts of water are stirred at 50°–80° C. until the condensation has completed. After having oxidised the mixture with an air stream, if desired in presence of piperidine or pyridine or dimethylaniline and some copper acetate, the dyestuff is filtered off and washed with alcohol and if desired purified by crystallisation. It is identical with the dyestuff of Example 2.

What I claim is:

1. New water-soluble anthraquinone compounds of the general formula

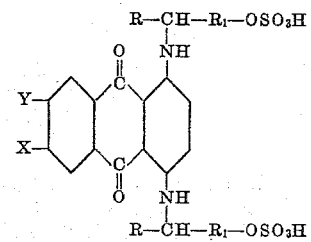

wherein R stands for alkyl, $R_1$ stands for alkylene, X stands for halogen and Y stands for a member selected from the group consisting of halogen and hydrogen, which dyestuffs dye wool, silk and nylon in brilliant blue shades being fast to light and not changing to red in artificial light.

2. The new water-soluble dyestuff of the formula

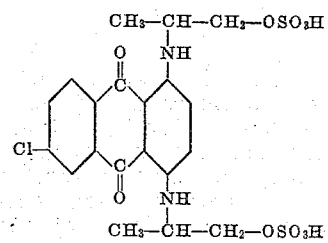

3. The new water-soluble dyestuff of the formula

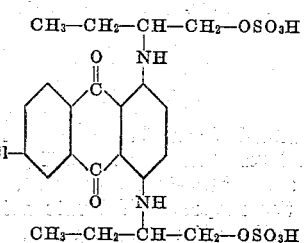

4. The new water-soluble dyestuff of the formula

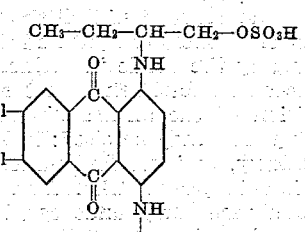

ERNST GUTZWILLER.